United States Patent [19]
Ando et al.

[11] Patent Number: 6,099,026
[45] Date of Patent: Aug. 8, 2000

[54] AIR BAG COVER

[75] Inventors: Masao Ando, Kasugai; Michio Inoue, Kagamigahara; Michihisa Asaoka, Ama-gun, all of Japan

[73] Assignee: Toyoda Gosei Co., Ltd., Aichi, Japan

[21] Appl. No.: 09/034,944

[22] Filed: Mar. 5, 1998

[30] Foreign Application Priority Data

Mar. 5, 1997 [JP] Japan ................................ 9-050253

[51] Int. Cl.⁷ .................................................. B60R 21/16
[52] U.S. Cl. ......................... 280/728.3; 280/728.1; 280/728.2; 442/181
[58] Field of Search ................. 428/36.1; 442/181; 280/728.3, 728.2, 728.1

[56] References Cited

U.S. PATENT DOCUMENTS 5,110,647  5/1992  Sawada et al. ........................ 428/43
5,221,108  6/1993  Hirabayashi et al. ................. 280/728

FOREIGN PATENT DOCUMENTS 54-3486  2/1979  Japan.

*Primary Examiner*—Daniel Zirker
*Attorney, Agent, or Firm*—Pillsbury Madison & Sutro LLP

[57] ABSTRACT

An air bag cover made from a woven textile and adapted to be used to cover a folded air bag, wherein a breakable portion allowed to be ruptured at the time of inflation of the air bag is constituted by a plurality of slits provided intermittently. An auxiliary slit is formed on a side of a connection portion between the slits so that threads disposed in the connection portion and intersecting extension line of the slits at the connection portion are cut.

9 Claims, 7 Drawing Sheets

AIR BAG COVER

BACKGROUND OF THE INVENTION

1. Field of the Invention

The present invention relates to an air bag cover for preventing a folded air bag from getting out of shape in the folded state and particularly to such an air bag cover made from a woven texture.

2. Description of the Related Art

Heretofore, an air bag cover described in Japanese Utility Model Publication No. Sho. 54-3486 is known as an air bag cover made from a woven texture for preventing a folded air bag from getting out of shape in the folded state. It is thought of that a large notch portion is formed to constitute a breakable portion or that a plurality of slits are provided intermittently to constitute a breakable portion.

In the case where the breakable portion is constituted by a plurality of slits provided intermittently, the length of a connection portion of the woven texture between the slits is preferably selected to be short so that the breakable portion is ruptured smoothly at the time of the inflation of the air bag.

If the length of the connection portion is made too short, however, there is a risk of occurrence of defective products because the connection portion may be ruptured at the time of the formation of the slits. Accordingly, conventionally, the length of the connection portion could not be set to be so short, and the large rupture strength of the breakable portion was required.

SUMMARY OF THE INVENTION

The present invention is designed to solve the aforementioned problem and has an object to provide an air bag cover formed from a woven texture in which the rupture strength of a breakable portion can be reduced even in the case where the breakable portion is constituted by a plurality of slits provided intermittently.

According to the present invention, there is provided a woven textile air bag cover to be used for covering a folded air bag, comprising: a breakable portion to be ruptured at an inflation of the air bag, the breakable portion being constituted by a plurality of slits provided intermittently; and an auxiliary slit being formed on a side of a connection portion existing between the slits so that threads disposed in the connection portion and intersecting an extension line of the slits at the connection portion are cut.

In the air bag cover according to the present invention, terminals of threads disposed in the connection portion between the slits so as to intersect the extension line of the slits at the connection portion are cut by an auxiliary slit. Accordingly, when the air bag is inflated, the threads are drawn out from its terminal side so that the region between the slits is ruptured.

That is, threads disposed in the connection portion between the slits and intersecting the extension line of the slits at the connection portion are not broken but drawn out so that the breakable portion is ruptured. Accordingly, even in the case where the length of the connection portion between the slits is long, the rupture strength of the breakable portion can be reduced.

Accordingly, even in the case where the air bag cover according to the present invention is formed from a woven texture having a breakable portion constituted by a plurality of slits provided intermittently, the rupture strength of the breakable portion can be reduced.

DETAILED DESCRIPTION OF THE PREFERRED EMBODIMENTS

A mode for carrying out the present invention will be described below with reference to the drawings.

Figure 1:
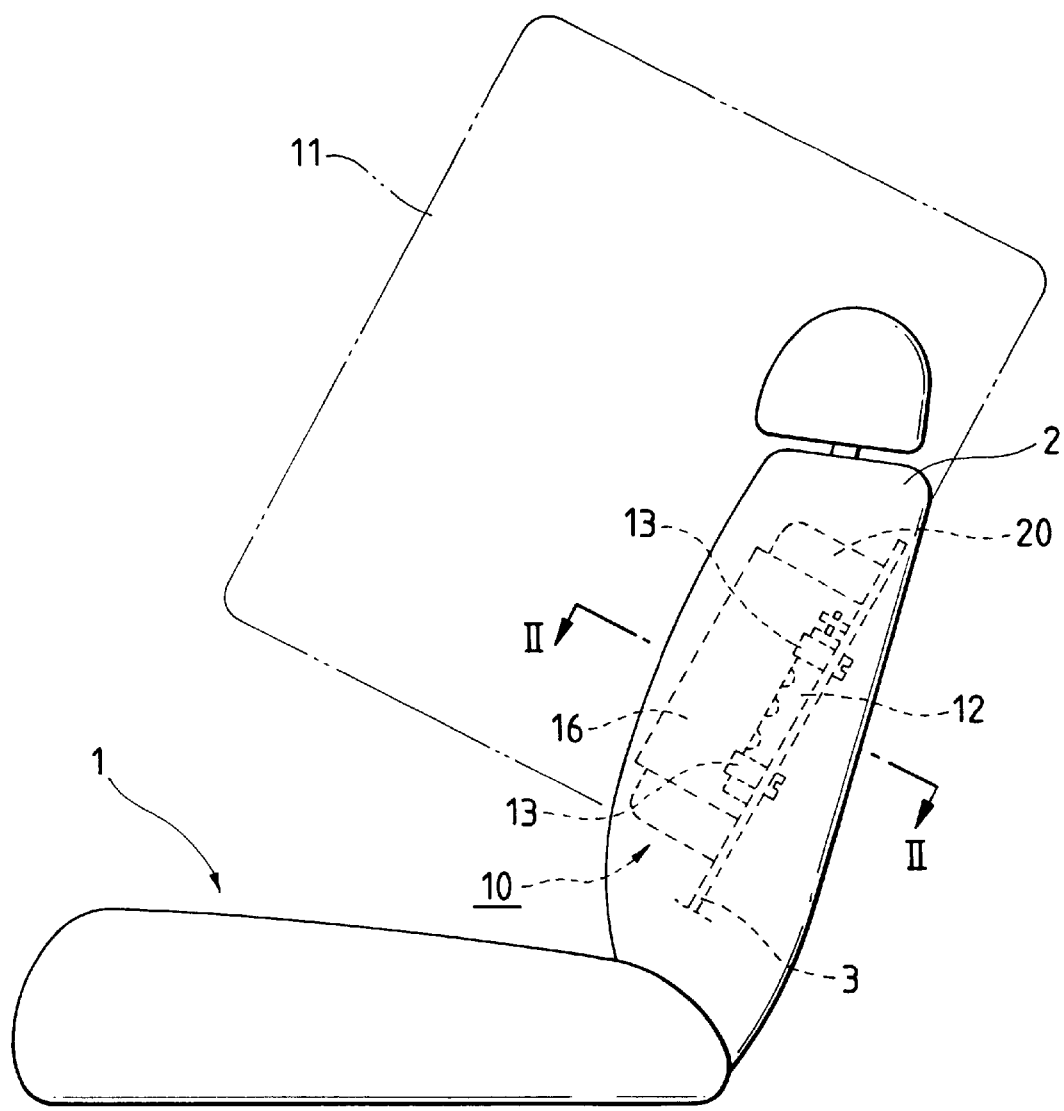
FIG. 1 is a side view showing a mode of use of an air bag apparatus in which an air bag cover according to a mode for carrying out the present invention is used.
Figure 2:
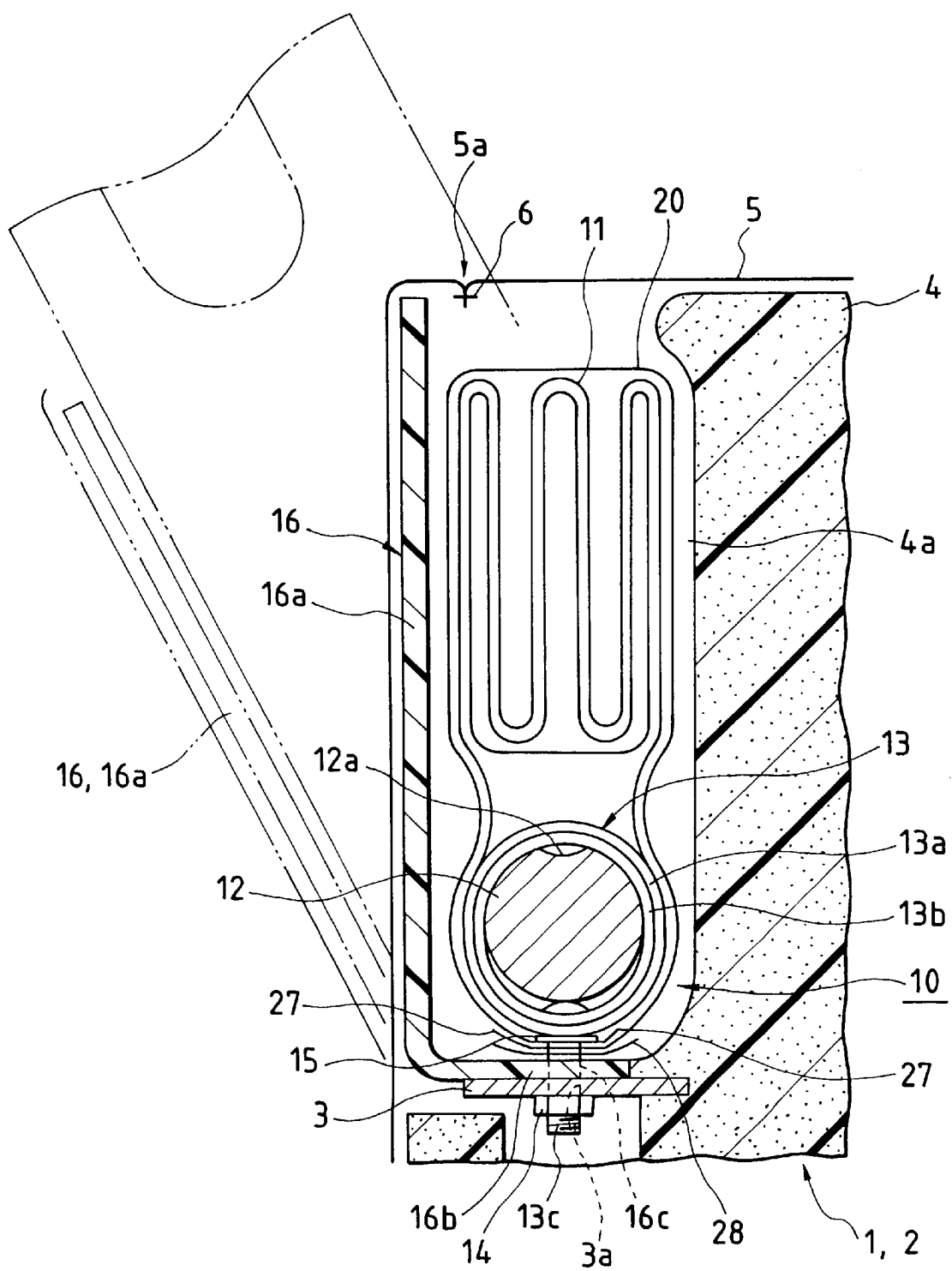
FIG. 2 is a schematic sectional view taken along the the line II—II in FIG. 1.
Figure 3:
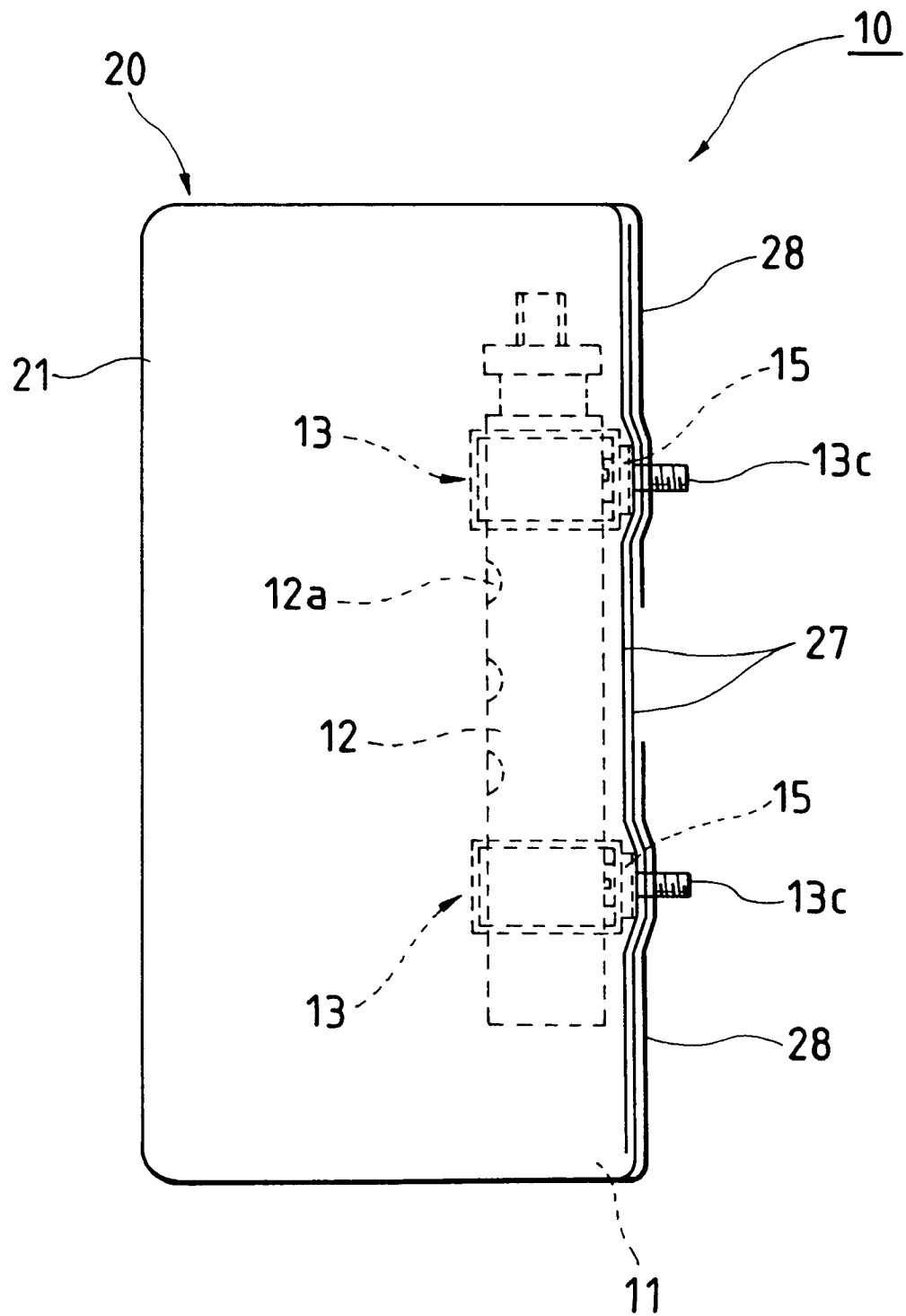
FIG. 3 is a side view of the air bag apparatus using the air bag cover according to this mode for carrying out the present invention.

As shown in FIGS. 1 to 3, an air bag cover 20 in this mode for carrying out the invention serves to cover an air bag 11 of a side-collision air bag apparatus 10 provided in a sheet back 2 in a vehicle sheet 1.

A frame 3 is disposed substantially vertically in a vehicle inner-wall-side side surface of the sheet back 2. A recess portion 4a is formed in a front cushion 4 of the frame 3. The air bag apparatus 10 is disposed in the recess portion 4a.

Incidentally, a facing 5 such as decorative cloth, or the like, is disposed in the outer circumference of the cushion 4 of the sheet back 2. A stitch 5a sewed by suture 6 is formed in front of the air bag apparatus 10. The reason why the stitch 5a is provided is that the stitch 5a is ruptured at the time of the inflation of the air bag 11 so that the air bag 11 can be inflated easily.

The side-collision air bag apparatus 10 includes an air bag 11 shaped like a rectangular plate at the time of the inflation of the air bag 11, and an inflator 12 disposed in the air bag 11 and having a gas discharge port 12a for discharging an inflation gas to inflate the air bag 11.

Two attachment brackets 13 each of which contains a cylindrical pipe portion 13a of sheet metal, a cushion 13b fastened to the inner circumferential surface of the pipe portion 13a, and a bolt 13c extended from the pipe portion 13a, are fastened to the inflator 12. The attachment of these attachment brackets 13 to the inflator 12 is performed by fitting and partially caulking the pipe portions 13a onto the inflator 12.

Further, the respective bolts 13c of the brackets 13 are protruded from the air bag 11, passed through attachment holes 16c of attachment base portions 16b of the cover 16 and attachment holes 3a of the frame 3 and attached with nuts 14 to thereby attach the inflator 12 inclusive of the folded air bag 11 to the sheet back 2. That is, the respective brackets 13 fill the role of attaching the air bag apparatus 10 to the sheet back 2.

Incidentally, the cover 16 is made of a synthetic resin and serves to cover the folded air bag 11 and the vehicle inner-wall-side side surface of the inflator 12 to thereby protect the air bag apparatus 10. The cover 16 includes a body portion 16a shaped like a rectangular plate, and an attachment base portion 16b bent from a rear end of the body portion 16a and provided with attachment holes 16c through which the bolts 13c of the attachment brackets 13 are passed respectively.

Figure 4:
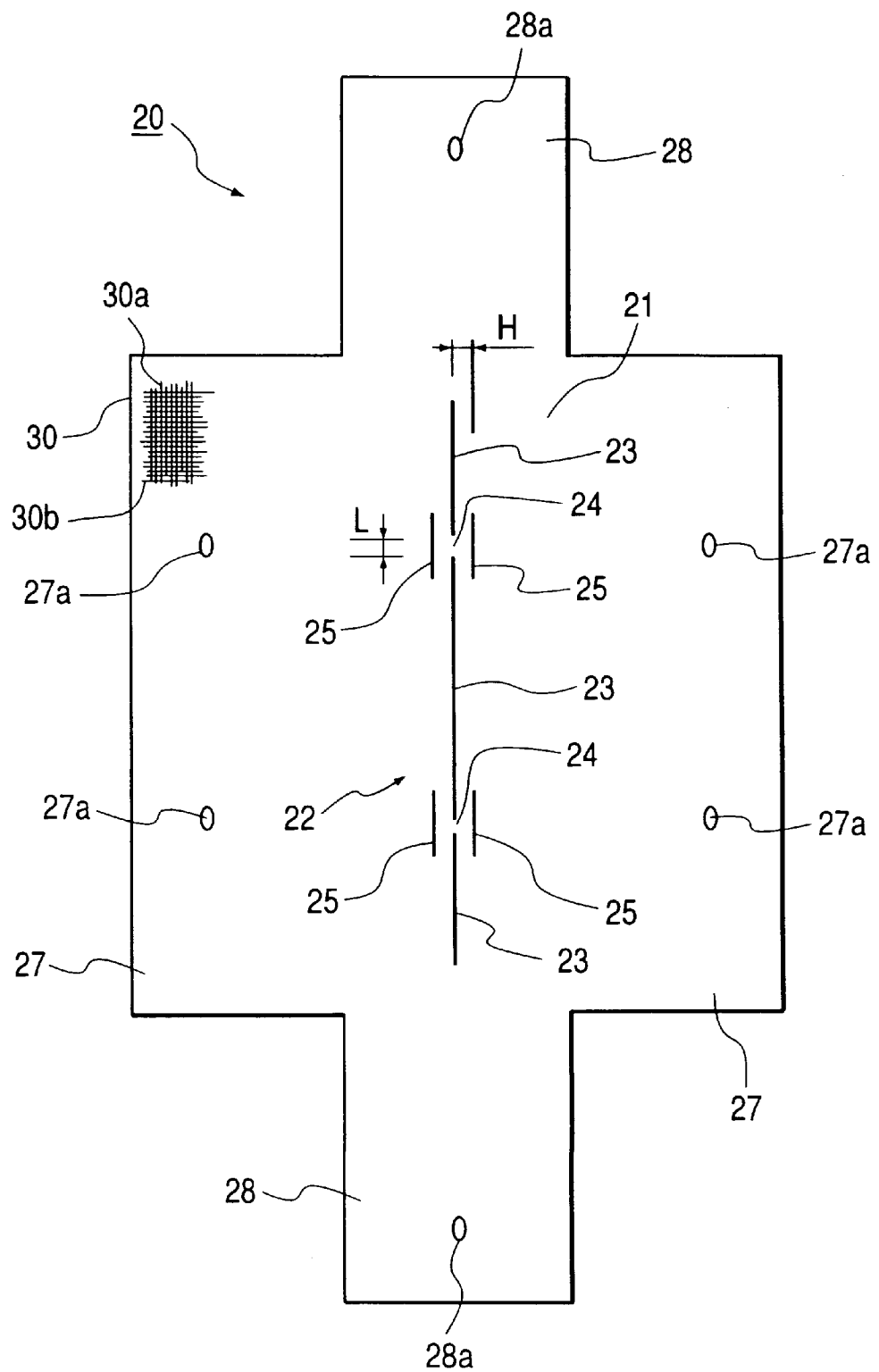
FIG. 4 is a development view of the air bag cover according to this mode for carrying out the present invention.

As shown in FIG. 4, the air bag cover 20 is formed from a texture 30 woven in the form of plain cloth, twilled cloth, satin, or the like, with threads of synthetic fiber such as polyamide, polyester, or the like, as warp threads 30a and woof threads 30b. In this mode for carrying out the invention, in the unfolded state, the air bag cover 20 is constituted by a body portion 21 shaped like a rectangle, and two pairs of attachment pieces 27 and 28 projected out from two pairs of opposite edges of four sides of the rectangular body portion 21. Incidentally, as occasion demands, woven texture having a surface brought into contact with the air bag 11 and coated with a heat-resistant coating material such as heat-resistant rubber, or the like, may be used as the woven texture 30. Incidentally, in this mode for carrying out the invention, the woven texture 30 is formed from the same material as the air bag 11 and has the inner circumferential-side surface coated with a heat-resistant coating material such as heat-resistant rubber, or the like.

Two pairs of stopper holes 27a are formed in the attachment pieces 27 respectively so that the circumferential edges of the stopper holes 27a are engaged with the bolts 13c of the attachment brackets 13 when the folded air bag 11 is covered. Two stopper holes 28a are formed in the attachment pieces 28 respectively so that the circumferential edges of the stopper holes 28a are engaged with the bolts 13c of the attachment brackets 13 when the folded air bag 11 is covered.

Three slits 23 are formed intermittently along the longitudinal direction of the body portion 21 of the air bag cover 20 in the center of the body portion 21, so that a breakable portion 22 is formed. Incidentally, in this mode for carrying out the invention, the slits 23 are formed along the warp threads 30a of the woven texture 30.

Figure 5A:
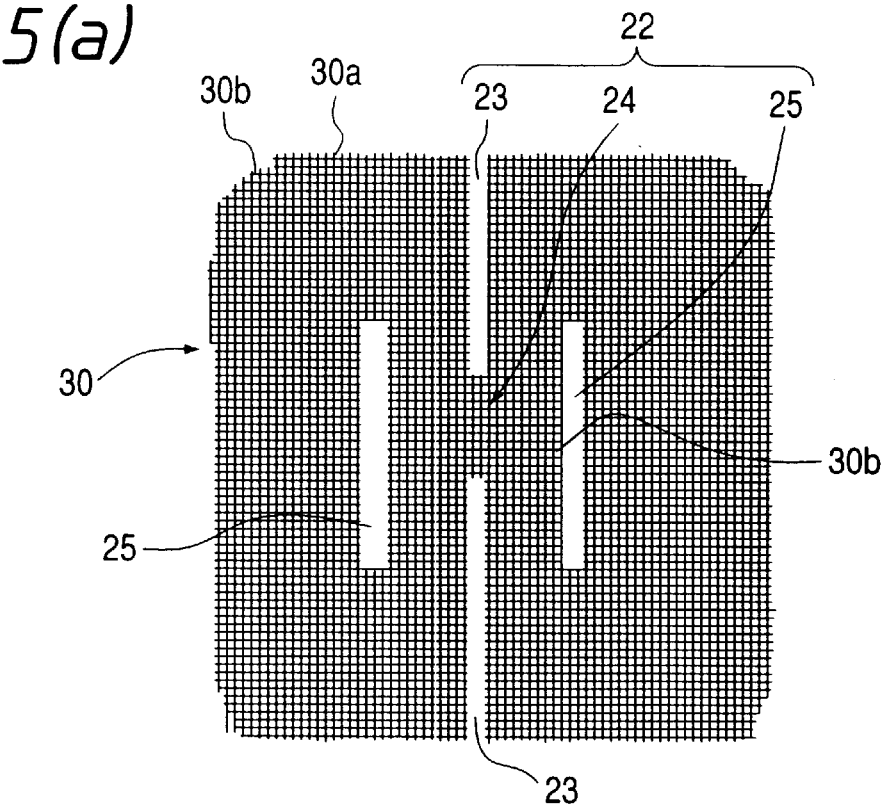
FIGS. 5(a) and 5(b) are views for explaining the rupture state of the air bag cover according to this mode for carrying out the present invention.
Figure 5A:

Further, auxiliary slits 25 are formed on the opposite sides of each of the two connection portions 24 between the slits 23 in such a region that all the woof threads 30b intersecting the extension line of the slits 23 in the connection portions 24, 24 are cut (see FIG. 5(a)).

Assembling of the air bag apparatus 10 will be described below. First, the air bag 11 is formed like a bag while the inflator 12 having the attachment brackets 13 attached thereto is inserted into the inside of the air bag 11. At this time, not only the bolts 13c of the attachment brackets 13 are protruded from the air bag 11 but also spring washers 15 are fitted onto the bolts 13c respectively to prevent the bolts 13c from dropping out of the air bag 11.

Then, the air bag 11 is folded by a suitable manner. Further, while the body portion 21 is brought into contact with the front side of the folded air bag 11, the attachment pieces 27 and 28 are bent. Further, while the circumferential edges of the stopper holes 27a and 28a are engaged with the bolts 13c respectively, the folded air bag 11 is covered with the air bag cover 20.

Thereafter, the air bag 11 covered with the air bag cover 20 is disposed, together with the cover 16, in the position of the frame 3 and the respective bolts 13c are passed through the attachment holes 16c and 3a and fixed with the nuts 14. Thus, the air bag apparatus 10 can be attached to the frame 3. Further, the facing 5 is sutured to the circumference of the cushion 4 and the sheet 1 is disposed in a vehicle. Thus, the air bag apparatus 10 can be attached to the vehicle.

If an inflation gas is discharged from the gas discharge port 12a of the inflator 12 after the attachment of the air bag apparatus 10 to the vehicle, the air bag 11 begins to be inflated as represented by the two-dot chain line in FIG. 2. Accordingly, not only the breakable portion 22 of the air bag cover 20 is ruptured substantially linearly but also the stitch 5a is ruptured. Furthermore, the body portion 16a of the cover 16 is pressed so as to be opened. Consequently, the air bag 11 becomes inflated largely until the inflation is completed.

Figure 5B:
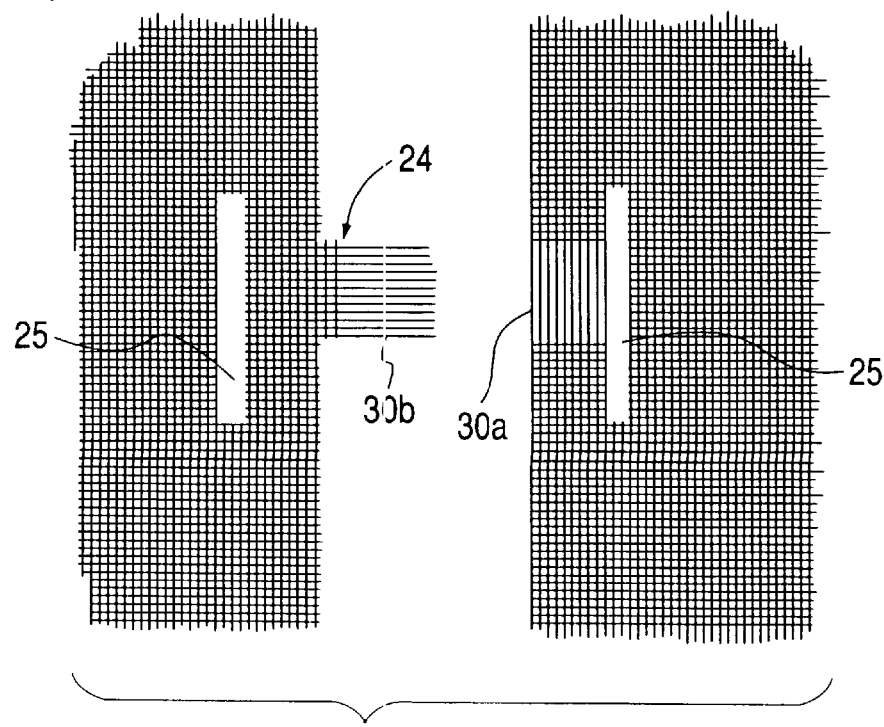

Further, in the air bag cover 20 at the time of the rupturing of the breakable portion 22, the terminals of all the woof threads 30b arranged in the connection portions 24 between the slits 23 so as to intersect the extension line of the slits 23 are ruptured by the auxiliary slits 25. Accordingly, at the time of the inflation of the air bag 11, the woof threads 30b are drawn out of the terminal side as shown in FIGS. 5(a) and 5(b). Consequently, the region between the slits 23 is ruptured.

That is, the woof threads 30b arranged in the connection portion 24 between the slits 23 and intersecting the extension line of the slits 23 are not ruptured but drawn out of the woven warp threads 30a, so that the breakable portion 22 is ruptured. Accordingly, even in the case where the length of the connection portion 24 between the slits 23 is long, the rupture strength of the breakable portion 22 can be reduced.

Incidentally, in the case where the length L of the connection portion 24 was 2 mm, the rupture strength of the breakable portion 22 in the air bag cover 20 having the auxiliary slits 25 provided could be reduced by 70% compared with that in an air bag cover having no auxiliary slit 25. Incidentally, the distance H between the slit 23 and the auxiliary slit 25 in the direction perpendicular to each other was 10 mm.

Accordingly, in the air bag cover 20 in this mode for carrying out the present invention, the rupture strength of the breakable portion 22 can be reduced even in the case where the breakable portion 22 is configured so that a plurality of slits 23 are provided intermittently.

Although this mode for carrying out the present invention has shown the case where auxiliary slits 25 are disposed on the opposite sides of the connection portion 24 between the slits 23, the invention can be applied to the case where an auxiliary slit is provided only on one of the opposite sides.

Further, if the distance H between the slit 23 and the auxiliary slit 25 in the direction perpendicular to each other is too small, the rupture strength is reduced excessively. If the distance H is too large, the resistance at the drawing-out of the threads is increased so that the rupture strength is increased excessively. Accordingly, the distance H is preferably selected to be in a range of from 5 to 15 mm.

Figure 6:
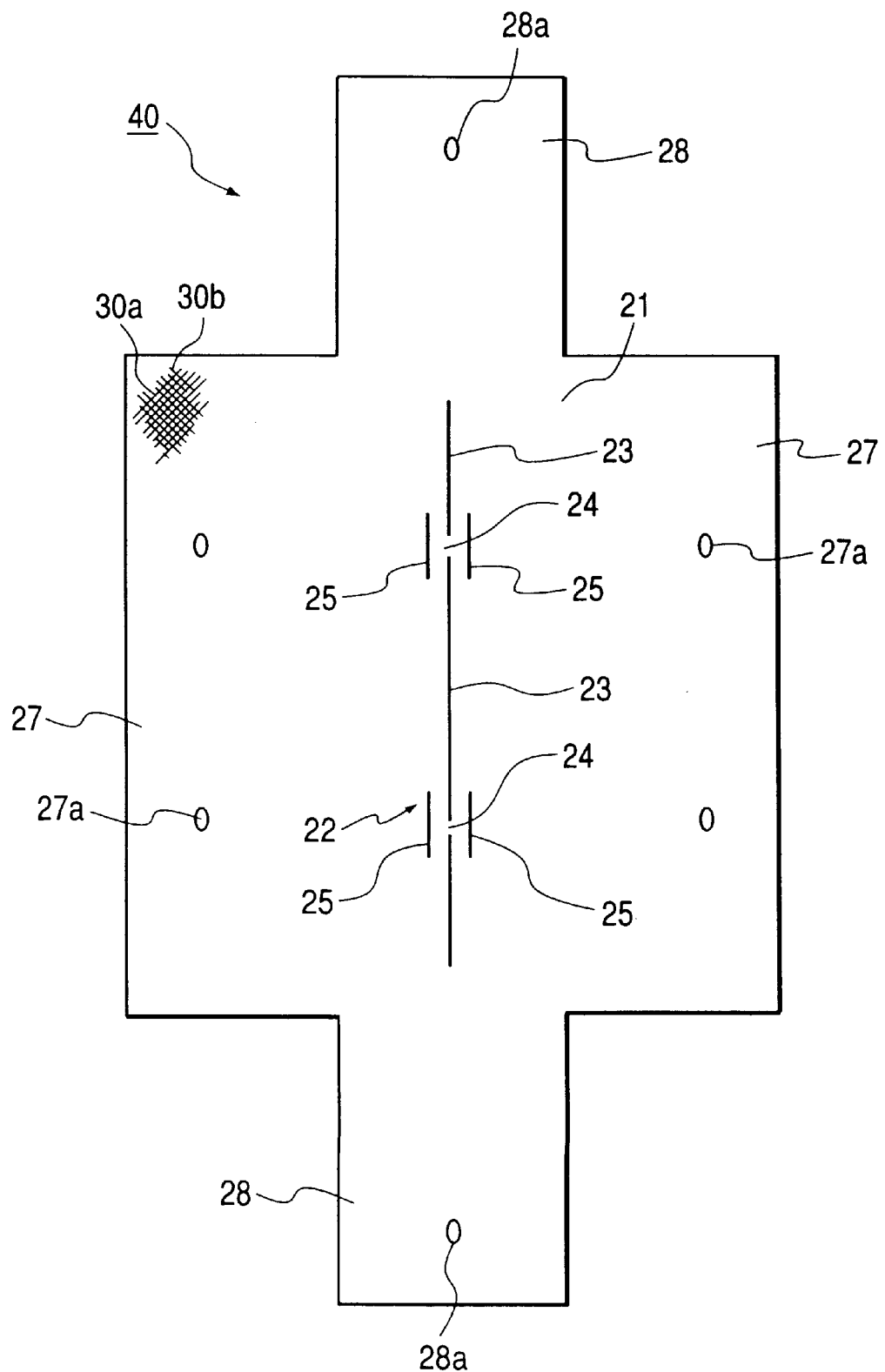
FIG. 6 is a development view of the air bag cover according to another mode for carrying out the present invention.

Although this mode for carrying out the present invention has shown the case where the slits 23 are formed in parallel with the warp threads 30a constituting the woven texture 30, it is a matter of course that the slits 23 need not be formed in parallel with any threads 30a or 30b. For example, even in the case where the air bag cover 40 per se is cut so as to intersect the warp and woof threads 30a and 30b like the air bag cover 40 shown in FIG. 6 and the slits 23 are formed so as to intersect the warp and woof threads 30a and 30b, configuration may be made so that an auxiliary slit 25 having a predetermined length is provided on at least one of the opposite sides of the connection portion 24. Incidentally, this auxiliary slit 25 must be formed in a region in which threads disposed in the connection portion 24 and intersecting the extension line of the slits 23, that is, not only woof threads 30*b* but also warp threads 30*a* are ruptured.

Figure 7:
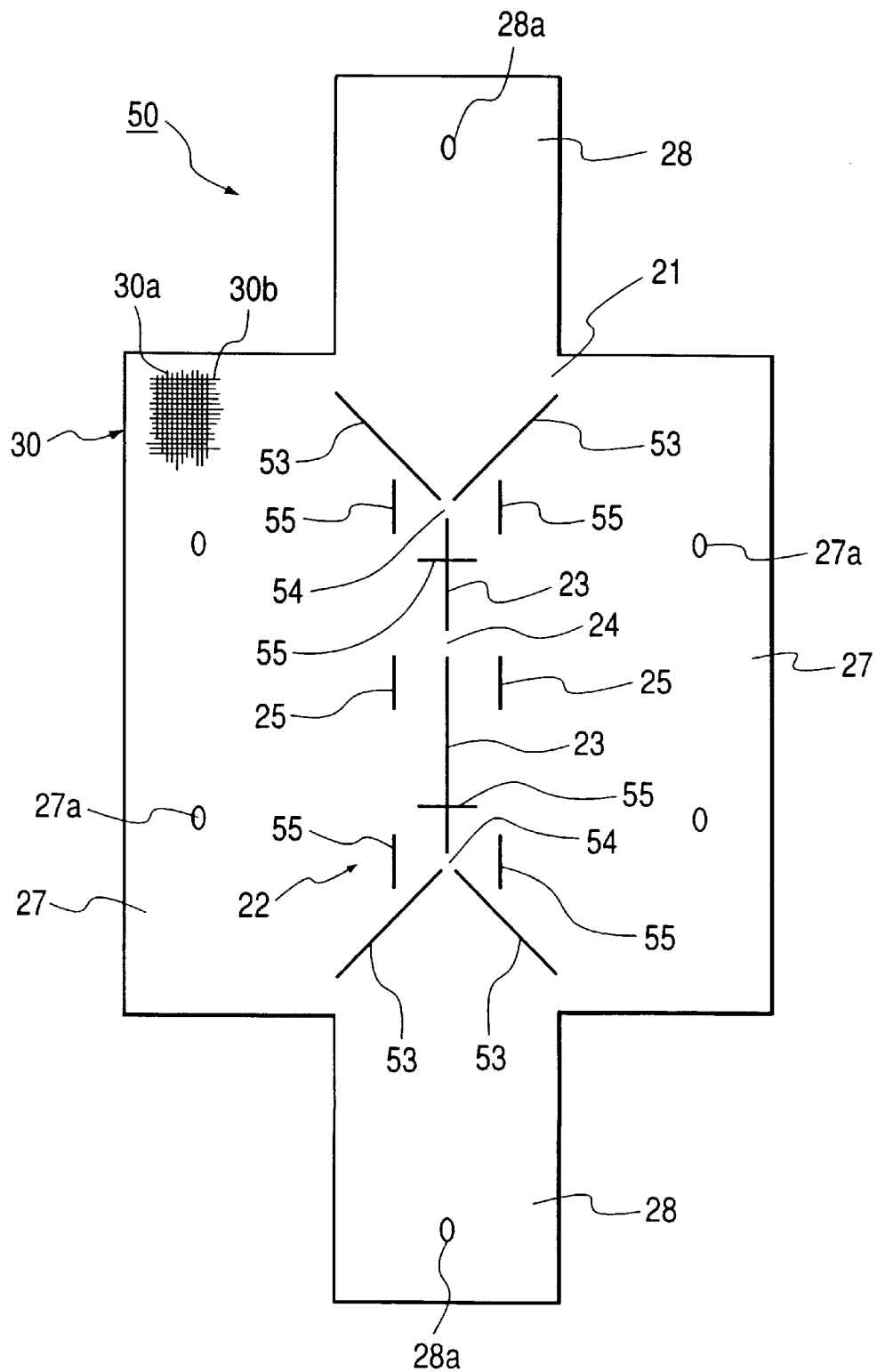
FIG. 7 is a development view of the air bag cover according to a further mode for carrying out the present invention.
Figure 7:
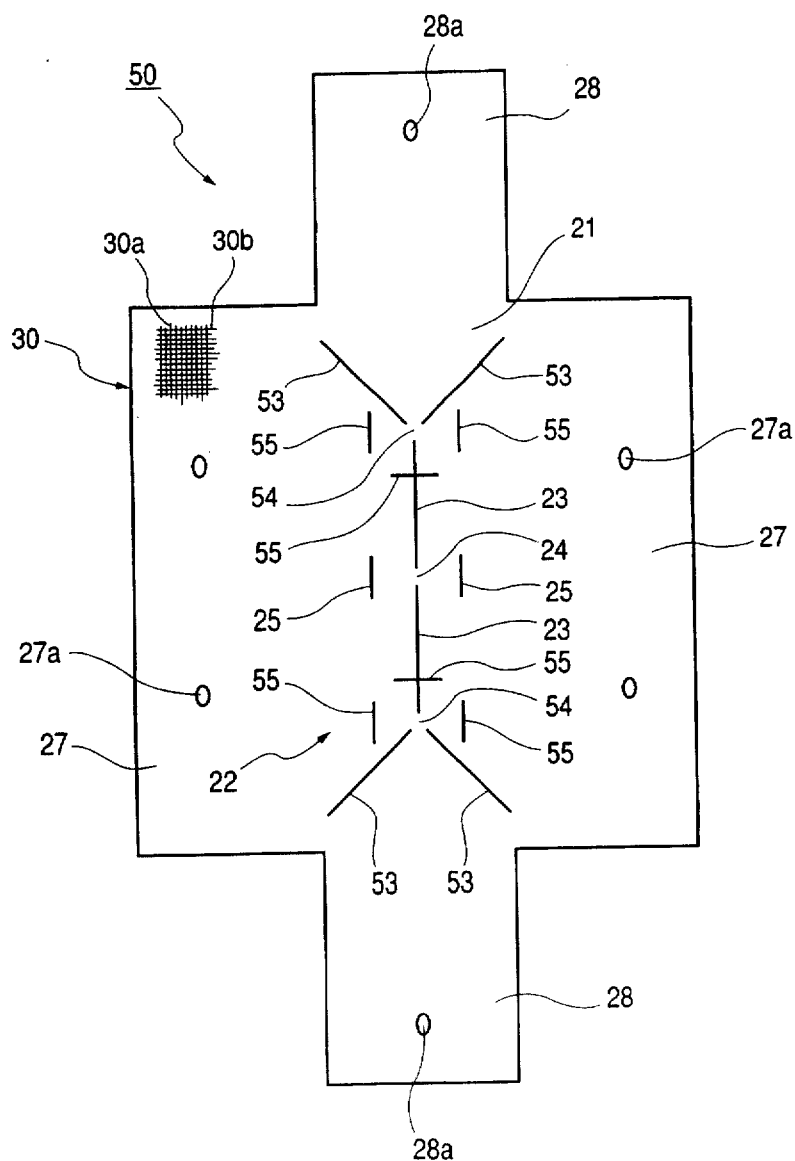

Although this mode for carrying out the present invention has shown the case where slits 23 are formed intermittently linearly, the invention can be applied to the case where the breakable portion 22 may be formed so that slits 53 having extension lines intersecting the extension line of the slits 23 other than the slits 23 disposed linearly are provided as represented by the air bag cover 50 shown in FIG. 7. Incidentally, in this case, auxiliary slits 55 on the opposite sides of the connection portions 54 between the slits 23 and 53 must be provided so that terminals of the warp and woof threads 30*a* and 30*b* disposed in the connection portions 54 and intersecting the extension lines of the slits 23 and 53 can be ruptured. Accordingly, the auxiliary slits 55 must be provided in at least two places (three places in this drawing) so as to intersect each other perpendicularly.

Although this mode for carrying out the present invention has been described about the air bag cover 20 for covering the air bag 11 used in the side-collision air bag apparatus 10, the present invention may be applied to an air bag cover for covering an air bag in a steering wheel air bag apparatus, an assistant seat air bag apparatus, etc.

What is claimed is:

1. A woven textile air bag cover with warp and weft threads to be used for a folded air bag, comprising:

a breakable portion to be ruptured upon inflation of the air bag, said breakable portion comprising a plurality of slits spaced apart such that any two adjacent slits do not cut a singular strand of either of said warp or weft threads more than once, the space between the nearest ends of any two adjacent slits forming a connection portion; and an auxiliary slit formed adjacent to the connection portion so that threads disposed within said connection portion are cut at a point offset from the connection portion, thus, upon inflation of said air bag, rupture of said breakable portion comprises the pulling of the cut threads from within the woven textile fabric.

2. The woven textile air bag cover according to claim 1, wherein auxiliary slits are formed adjacent both sides of said connection portion.

3. The woven textile air bag cover according to claim 1, wherein said woven air bag cover comprises a body portion shaped like a rectangle, and two pairs of attachment pieces projecting outwardly from opposing edges of said body portion, and said breakable portion is formed centrally within said body portion.

4. The woven textile air bag cover according to claim 1, wherein the distance between said plurality of slits and said auxiliary slits in a direction perpendicular to each other ranges between 5 to 15 mm.

5. The woven textile air bag cover according to claim 1, wherein the length of said connection portion is 2 mm.

6. The woven textile air bag cover according to claim 1, wherein said plurality of slits are formed parallel with said warp threads.

7. The woven textile air bag cover according to claim 1, wherein said plurality of slits are formed so as to intersect warp and weft threads.

8. The woven textile air bag cover according to claim 1, wherein said plurality of slits are formed along a single line.

9. The woven textile air bag cover according to claim 1, wherein said auxiliary slit is positioned parallel to said plurality of slits.

* * * * *

UNITED STATES PATENT AND TRADEMARK OFFICE
CERTIFICATE OF CORRECTION

PATENT NO. : 6,099,026
DATED : August 8, 2000
INVENTOR(S) : Ando et al.

Page 1 of 2

It is certified that error appears in the above-identified patent and that said Letters Patent is hereby corrected as shown below:

Drawings,
Delete Figure 7, and substitute therefor the Figure 7, as shown on the attached page.

Signed and Sealed this

Twenty-third Day of April, 2002

Attest:

JAMES E. ROGAN
Attesting Officer   Director of the United States Patent and Trademark Office